United States Patent [19]

Ueda

[11] Patent Number: 5,588,101
[45] Date of Patent: Dec. 24, 1996

[54] BIT DATA PROCESSOR

[75] Inventor: Shigeru Ueda, Wako, Japan

[73] Assignee: Canon Kabushiki Kaisha, Tokyo, Japan

[21] Appl. No.: 471,880

[22] Filed: Jun. 7, 1995

Related U.S. Application Data

[62] Division of Ser. No. 141,706, Oct. 27, 1993, which is a continuation of Ser. No. 750,696, Aug. 20, 1991, abandoned, which is a continuation of Ser. No. 378,489, Jul. 12, 1989, abandoned, which is a continuation of Ser. No. 875,564, Jun. 18, 1986, abandoned.

[30] Foreign Application Priority Data

Jun. 27, 1985 [JP] Japan ................... 60-138979

[51] Int. Cl.$^6$ ................... G06F 3/00; G06F 9/00
[52] U.S. Cl. ............... 395/792; 364/931.03; 364/943.43; 364/943.44; 364/DIG. 2; 395/785
[58] Field of Search ................... 395/110, 150, 395/151, 275, 148, 800

[56] References Cited

U.S. PATENT DOCUMENTS

| | | | |
|---|---|---|---|
| 3,916,388 | 10/1975 | Shimp | 360/172.5 |
| 3,997,771 | 12/1976 | Perlowski et al. | 235/156 |
| 4,122,534 | 10/1978 | Cesaratto | 364/900 |
| 4,149,263 | 4/1979 | Prioste | 364/900 |
| 4,300,206 | 11/1981 | Belleson et al. | 395/275 |
| 4,330,834 | 5/1982 | Murphy | 395/144 |
| 4,383,304 | 5/1983 | Hirashima . | |
| 4,400,791 | 8/1983 | Kitado . | |
| 4,410,990 | 10/1983 | Wilkson . | |
| 4,451,883 | 5/1986 | Stanley et al. . | |
| 4,527,252 | 7/1985 | Donohou et al. . | |
| 4,590,585 | 5/1986 | Cummings et al. | 395/275 |
| 4,604,723 | 8/1986 | Burrows | 364/786 |
| 4,615,012 | 9/1986 | Arazu | 395/110 |
| 4,625,295 | 11/1986 | Skinner . | |
| 4,627,749 | 12/1986 | Meo . | |
| 4,635,212 | 1/1987 | Hatazawa | 395/110 |
| 4,737,923 | 4/1988 | Matsuzaki et al. | 395/111 |
| 4,747,154 | 5/1988 | Suzuki et al. | 382/47 |
| 4,843,593 | 6/1989 | Yanaru . | |

FOREIGN PATENT DOCUMENTS

| | | |
|---|---|---|
| 2926048 | 1/1980 | Germany . |
| 79/01166 | 12/1979 | WIPO . |

*Primary Examiner*—Kevin J. Teska
*Assistant Examiner*—Ayni Mohamed
*Attorney, Agent, or Firm*—Fitzpatrick, Cella, Harper & Scinto

[57] ABSTRACT

A bit data processor includes bit data input device, an indicator for indicating a shift distance of the bit data inputted by the input device and modifying the indication data in accordance with an output position of the bit data, and memory means for receiving, as an address, the bit data supplied by the input means and the indication data supplied from the indication means to output a shifted bit data.

10 Claims, 6 Drawing Sheets

FIG. 2

| 121 | 111 | | 112 ADDRESS | | | | | | | | | | 120 OUTPUT DATA | | | | | | | |
|---|---|---|---|---|---|---|---|---|---|---|---|---|---|---|---|---|---|---|---|---|
| A11 | A10 | A9 | A8 | A7 | A6 | A5 | A4 | A3 | A2 | A1 | A0 | $\overline{O7}$ | $\overline{O6}$ | $\overline{O5}$ | $\overline{O4}$ | $\overline{O3}$ | $\overline{O2}$ | $\overline{O1}$ | $\overline{O0}$ |
| 0 | 0 | 0 | 0 | A7 | A6 | A5 | A4 | A3 | A2 | A1 | A0 | A7 | A6 | A5 | A4 | A3 | A2 | A1 | A0 |
|   |   |   | – | – | – | – | – | – | – | – | – | 0 | A7 | A6 | A5 | A4 | A3 | A2 | A1 |
|   |   | 0 | 0 | – | – | – | – | – | – | – | – | 0 | 0 | A7 | A6 | A5 | A4 | A3 | A2 |
|   |   |   | – | – | – | – | – | – | – | – | – | 0 | 0 | 0 | A7 | A6 | A5 | A4 | A3 |
|   | 0 |   | 0 | – | – | – | – | – | – | – | – | 0 | 0 | 0 | 0 | A7 | A6 | A5 | A4 |
|   |   |   | – | – | – | – | – | – | – | – | – | 0 | 0 | 0 | 0 | 0 | A7 | A6 | A5 |
|   |   | 0 | 0 | – | – | – | – | – | – | – | – | 0 | 0 | 0 | 0 | 0 | 0 | A7 | A6 |
|   |   |   | – | – | – | – | – | – | – | – | – | 0 | 0 | 0 | 0 | 0 | 0 | 0 | A7 |
| 0 |   |   | 0 | – | – | – | – | – | – | – | – | A0 | 0 | 0 | 0 | 0 | 0 | 0 | 0 |
|   |   |   | – | – | – | – | – | – | – | – | – | A1 | A0 | 0 | 0 | 0 | 0 | 0 | 0 |
|   |   | 0 | 0 | – | – | – | – | – | – | – | – | A2 | A1 | A0 | 0 | 0 | 0 | 0 | 0 |
|   |   |   | – | – | – | – | – | – | – | – | – | A3 | A2 | A1 | A0 | 0 | 0 | 0 | 0 |
|   | – |   | 0 | – | – | – | – | – | – | – | – | A4 | A3 | A2 | A1 | A0 | 0 | 0 | 0 |
|   |   |   | – | – | – | – | – | – | – | – | – | A5 | A4 | A3 | A2 | A1 | A0 | 0 | 0 |
|   |   | – | 0 | – | – | – | – | – | – | – | – | A6 | A5 | A4 | A3 | A2 | A1 | A0 | 0 |
| – |   |   | – | A7 | A6 | A5 | A4 | A3 | A2 | A1 | A0 | A7 | A6 | A5 | A4 | A3 | A2 | A1 | A0 |

1

BIT DATA PROCESSOR

This application is a division of application Ser. No. 08/141,706 filed Oct. 27, 1993, which is a continuation of application Ser. No. 07/750,696 filed Aug. 20, 1991, abandoned, which is a continuation of application Ser. No. 07/378,489 filed Jul. 12, 1989, abandoned, which is a continuation of application Ser. No. 06/875,564 filed Jun. 18, 1986, abandoned.

BACKGROUND OF THE INVENTION

1. Field of the Invention

The present invention relates to a bit data processor, and more particularly to a bit data processor which shifts a bit data by a desired number of bits.

2. Related Background Art

In a printer which prints out text information in the form of bit image, a character pattern data for character codes of the text information is developed as a bit image on an image memory before it is printed out. The image memory of such a printer is usually read and written 4–8 bits parallel in accordance with a bit width of a data bus of a CPU. The character pattern data is of variety of forms, such as 8×10 bits, 14×18 bits or 24×24 bits, and in order to develop it on the image memory at a predetermined character interval, it is necessary to shift the character pattern data bit by bit in accordance with the address of the image memory.

In order to achieve it, the character pattern data is shifted bit by bit by a register in the CPU and then it is written into the image memory 4 bits parallel or 8 bits parallel, or a high speed shift circuit is provided between the CPU and the image memory and the character pattern data is shifted thereby and then it is written into the image memory. In the former method, the processing speed is too low when a high speed printer such as a laser beam printer is used. In the latter method, when a shift value is different from character pattern to character pattern, the CPU must updates the shift value of the high speed shift circuit and the high speed feature of the high speed shift circuit is not fully utilized.

SUMMARY OF THE INVENTION

It is an object of the present invention to remove the drawbacks above-mentioned.

It is another object of the present invention to improve a bit data processor which can shift a bit data.

It is another object of the present invention to provide a bit data processor which can shift a bit data by a desired number of bits with a relatively simple configuration.

It is another object of the present invention to provide a bit data processor which can shift a data bit at a high speed.

It is another object of the present invention to provide a bit data processor which can move image data by a desired distance.

It is another object of the present invention to provide a bit data processor which can shift data with a conventional data input.

Other objects of the present invention will be apparent from the following description and claims.

BRIEF DESCRIPTION OF THE DRAWINGS

FIG. 2 shows the content of a bit shift ROM.

DETAILED DESCRIPTION OF THE PREFERRED EMBODIMENT

[Data Conversion Circuit (FIGS. 1 and 2)]

Figure 1:
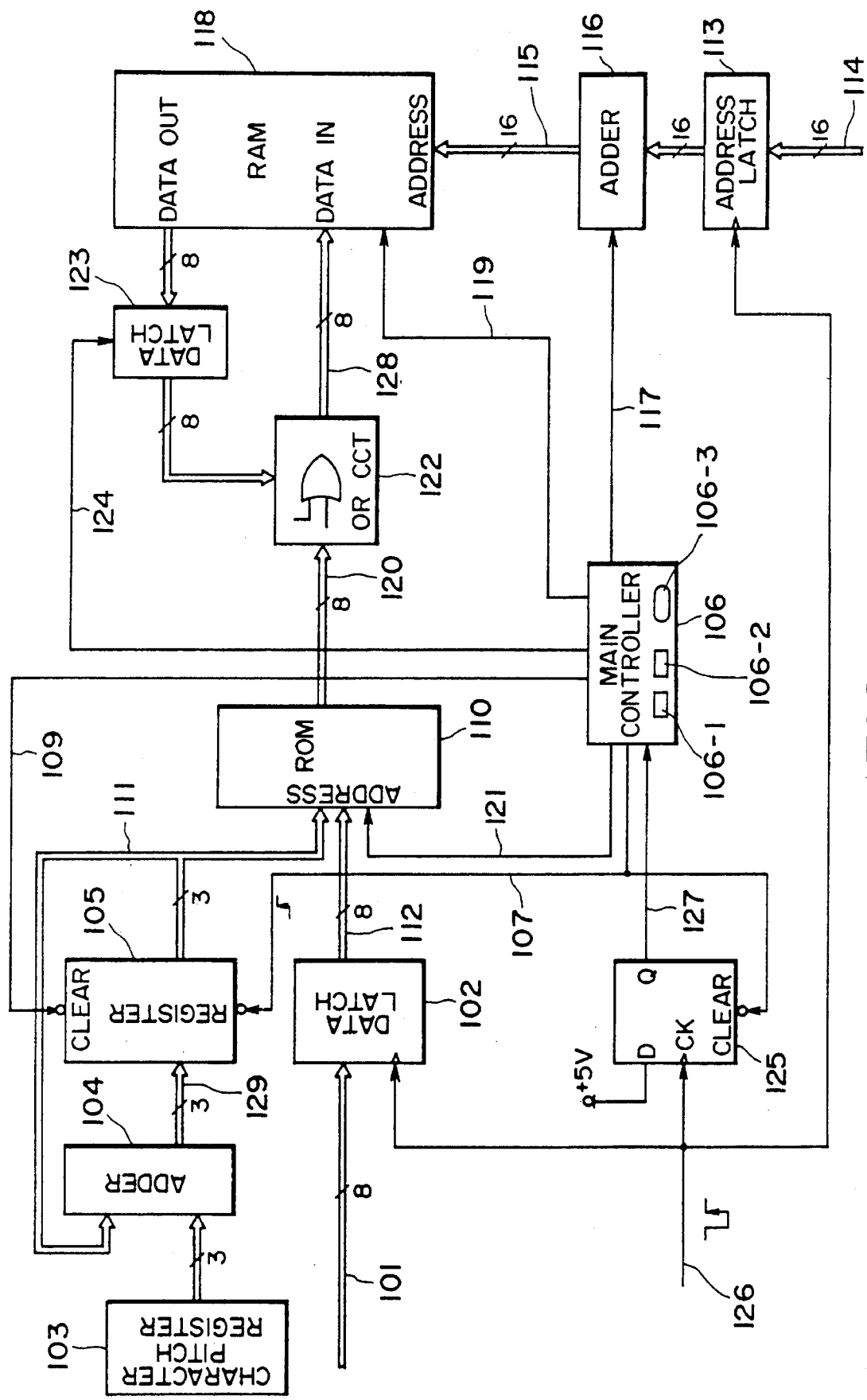
FIG. 1 shows a data conversion circuit in accordance with one embodiment of the present invention.

FIG. 1 shows a data conversion circuit for a character pattern in accordance with one embodiment of the present invention. Arrow lines indicate signals or information and numerals shown near oblique lines on the arrow lines indicate the numbers of bits of the signals or information. The character pattern in the present embodiment includes alphanumeric characters such as "A", "B", "3", "7" as well as graphic patterns.

Numeral 101 denotes a character pattern data (dot data) of 8-bit configuration supplied from a-data generation circuit (not shown), numeral 102 denotes a latch circuit for latching the character pattern data 101 by a latch signal 126 and numeral 103 denotes an intercharacter pitch register which stores intercharacter pitch data. The content of the register 103 determines a shift distance of the character pattern data 101.

Numeral 104 denotes a 3-bit adder which adds the content of the intercharacter pitch register 103 to the content of the register 105. Numeral 105 denotes a register which latches the output of the adder 104 at a rise of a latch signal 107 and cleared by a clear signal 109, and numeral 106 denotes a main control unit which includes a CPU such as a microcomputer, and ROM and RAM (106-1, 106-2, 106-3).

Numeral 110 denotes a bit shift ROM (table) which produces an 8-bit data 120 when addressed by a signal 111 from the register 105, a signal 112 from the data latch 102 and a signal 121 from the main control unit 106. Numeral 113 denotes an address latch which latches an address information 114 supplied from a host computer by a latch signal 126, numeral 116 denotes an adder which adds the output of the address latch 113 to a signal 117 supplied from the main control unit 106, and numeral 118 denotes a bit image RAM which writes an output of an OR circuit 122 into an address designated by the output of the adder 116 by a write signal 119 from the main control unit 106. The RAM 118 may store a bit data of one page of an image to be printed out by a printer (not shown).

Numeral 123 denotes a data latch circuit which latches the output data of the RAM 118 by a latch signal 124 supplied from the main control unit 106, and numeral 125 denotes a D type flip-flop which is set by a latch signal 126 to inform to the main control unit 106 that the data 101 has been latched in the data latch 102.

FIG. 2 shows a content of the bit shift ROM 110. When the ROM 110 is addressed by the 3-bit (A8–A10) signal 111 from the register 105, the signal 121 from the main control unit 106 and the 8-bit (A0–A7) data 112 from the data latch 102, it outputs the bit data 120 shown in FIG. 2.

[Shifting of the character Pattern (FIGS. 3A–3C)]

Figure 3A:
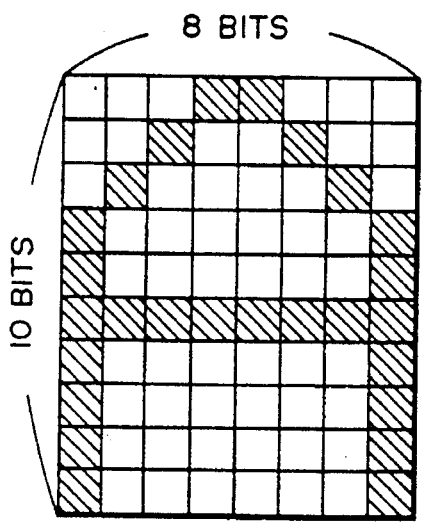
FIG. 3A shows an 8×10 character pattern.
Figure 3B:
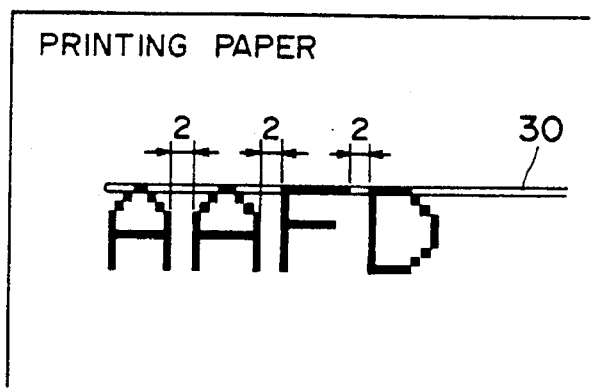
FIG. 3B shows a printout printed at 2-bit interval.
Figure 3C:
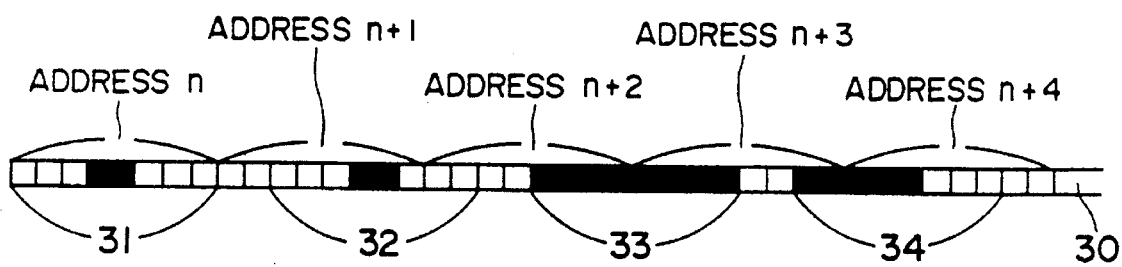
FIG. 3C shows a memory configuration when the printout of FIG. 3B is made.

FIG. 3A shows an 8×10-bit character pattern, FIG. 3B shows printing of the character pattern shown in FIG. 3A on a print sheet by a printer (not shown) at a character pitch of two, and FIG. 3C shows a relationship between the printed data (bit image) of the line 30 shown in FIG. 3B and the address of the RAM 118. Numerals 31 and 32 denote data for the characters "A", numeral 33 denotes data for the character "F" and numeral 34 denotes data for the character "D" on the line 30. [Circuit Operation (FIGS. 1–4)]

The conversion shown in FIGS. 3B and 3C is explained with reference to FIGS. 1–4.

In this case, it is assumed that 2 (010) has been preset in the intercharacter pitch register 103, the register 105 has been cleared by the clear signal 109 from the main control unit 106 and the RAM 118 has been cleared.

Figure 4:
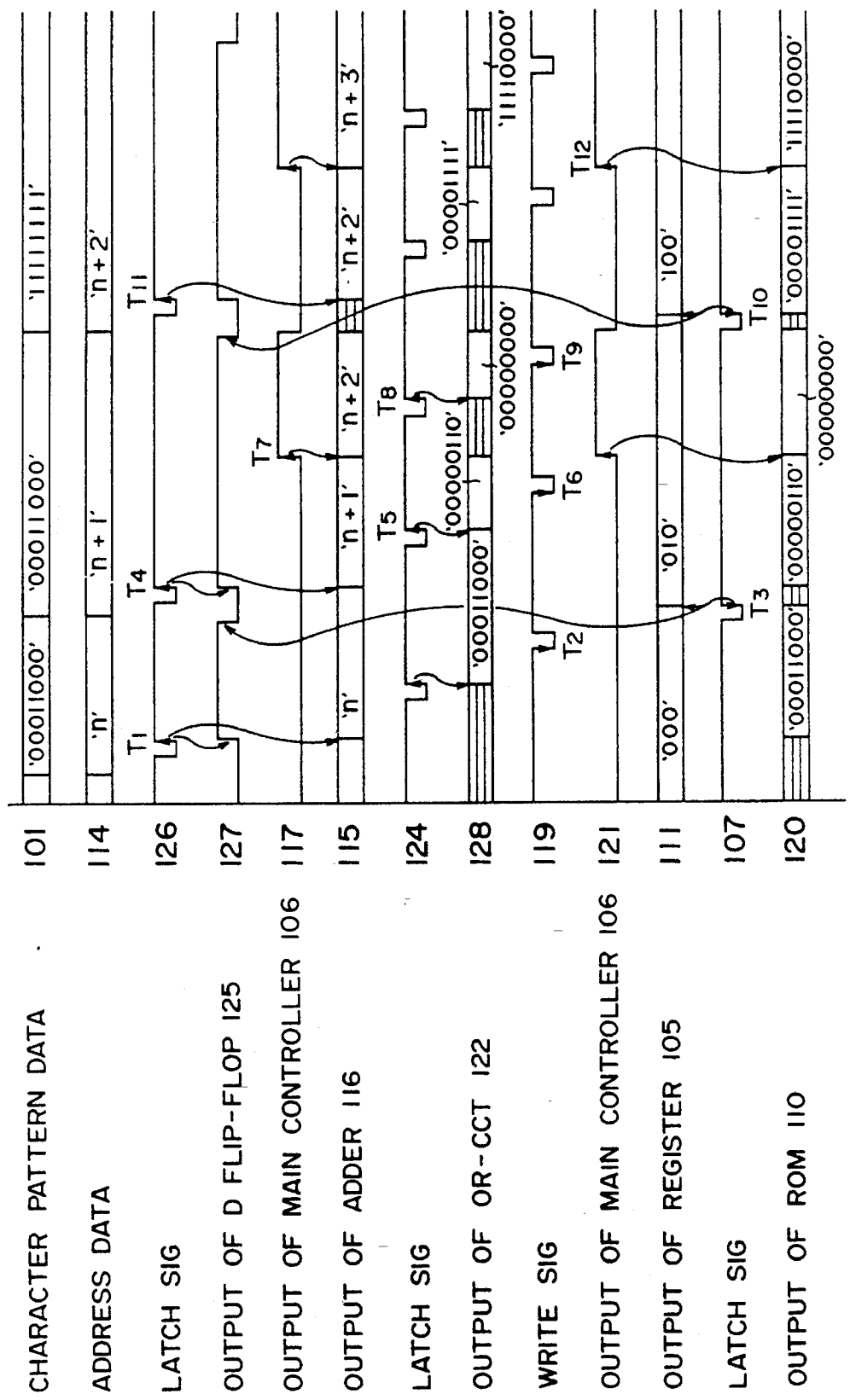
FIG. 4 shows a timing chart for the circuit of FIG. 1.

The 8-bit character pattern data 101 to be written into the RAM 118 and the address data 114 are externally supplied, and when the latch signal 126, which is the write pulse, is supplied (at this time, the address data 114 is n and the character pattern data 101 is "00011000" as shown in FIG. 3C), the Q output 127 of the D flip-flop assumes a high level to inform to the main control unit 106 that the data has been received (timing $T_1$ in FIG. 4).

Since the main control unit 106 renders the signals 117 and 121 to a low level and clears the register 105, the output data 111 of the register 105 is "0" and the output data 120 of the bit shift ROM 110 is same as the data 112, that is, "00011000". Since the addresses A8–A11 of the bit shift ROM 110 are "0000", when "00011000" is supplied to the addresses A0–A7, the ROM 110 produces "00011000" (see FIG. 2). This data 120 is written into the address n of the RAM 118 by the write signal 119 at a timing $T_2$ of FIG. 4. Since the signal 117 is now at the low level, the adder 116 supplies the address data "n" 114 as it is to the RAM 118.

Then, the main controller 106 produces the latch signal 107 to latch the output of the adder 104 to the register 105. Thus, the output data 111 (address A8–A10) of the register 105 changes to "010" and the D flip-flop 125 is cleared and the signal 127 assumes the low level (timing $T_3$).

When the address data 114 is "n+1" and character pattern the data 101 representing "A" is "00011000" (timing $T_4$), the signal 121 is at the low level or "0" and the address A0–A11 of the ROM 110 changes to "001000011000", and the output data 120 is "00000110" (see FIG. 2). Since the data at the address n+1 of the RAM is "0", this data is latched into the data latch 123 by the latch signal 124. Thus, the output data 128 of the OR circuit 122 is equal to the output data 120 (timing $T_5$), and "00000110" is written into the address n+1 by the next write signal 119 (timing $T_6$).

When the signals 117 and 121 are at the high level, the address 115 of the RAM 118 is n+2 (timing $T_7$). When the latch signal 124 is produced, the content at the address n+2 of the RAM 118, that is, "0" is latched in the data latch 123. On the other hand, since A11 is "1", A10–A8 are "010" and A7–A0 are "00011000", the address of the ROM 110 is "101000011000" and the output data 120 of the bit shift ROM 110 is "00000000" (timing $T_8$). Thereafter, "0" is written into the address n+2 of the RAM 118 by the write signal 119 (timing $T_9$).

When the main control unit 106 produces the signal 107 to latch the register 105 and clear the D flip-flop 125, the output 111 of the register 105 is "100" (010+010=100) (timing $T_{10}$). The signals 117 and 121 are substantially simultaneously rendered to the low level.

When the address 114 is n+2 and the data 101 which represents the character pattern "F" is supplied as "11111111" (timing $T_{11}$), the address of the ROM 110 is "010011111111" because A11 is "0", A10–A8 are "100" and A7–A0 are "11111111", and "00001111" is written into the address n+2 of the RAM 118. Then, the signals 117 and 121 are rendered high level and the address n+3 of the RAM 118 is read into the data latch 123 and the address of the ROM 110 is changed to "110011111111". Thus, the output data 120 is "11110000" and "11110000" is written into the address n+3 of the RAM 118 by the write signal 119 (timing $T_{12}$).

The above operation is repeated. If the character pattern 34 for the character "D" shown in FIGS. 3B and 3C is supplied to the address n+3, the output of the data latch 123 "11110000" and the data 120 "00000011" are logically ORed by the OR circuit 122 and the output thereof is stored at the address n+3 of the RAM 118. [Operation of Main Control Unit (FIGS. 1 and 5)]

Figure 5:
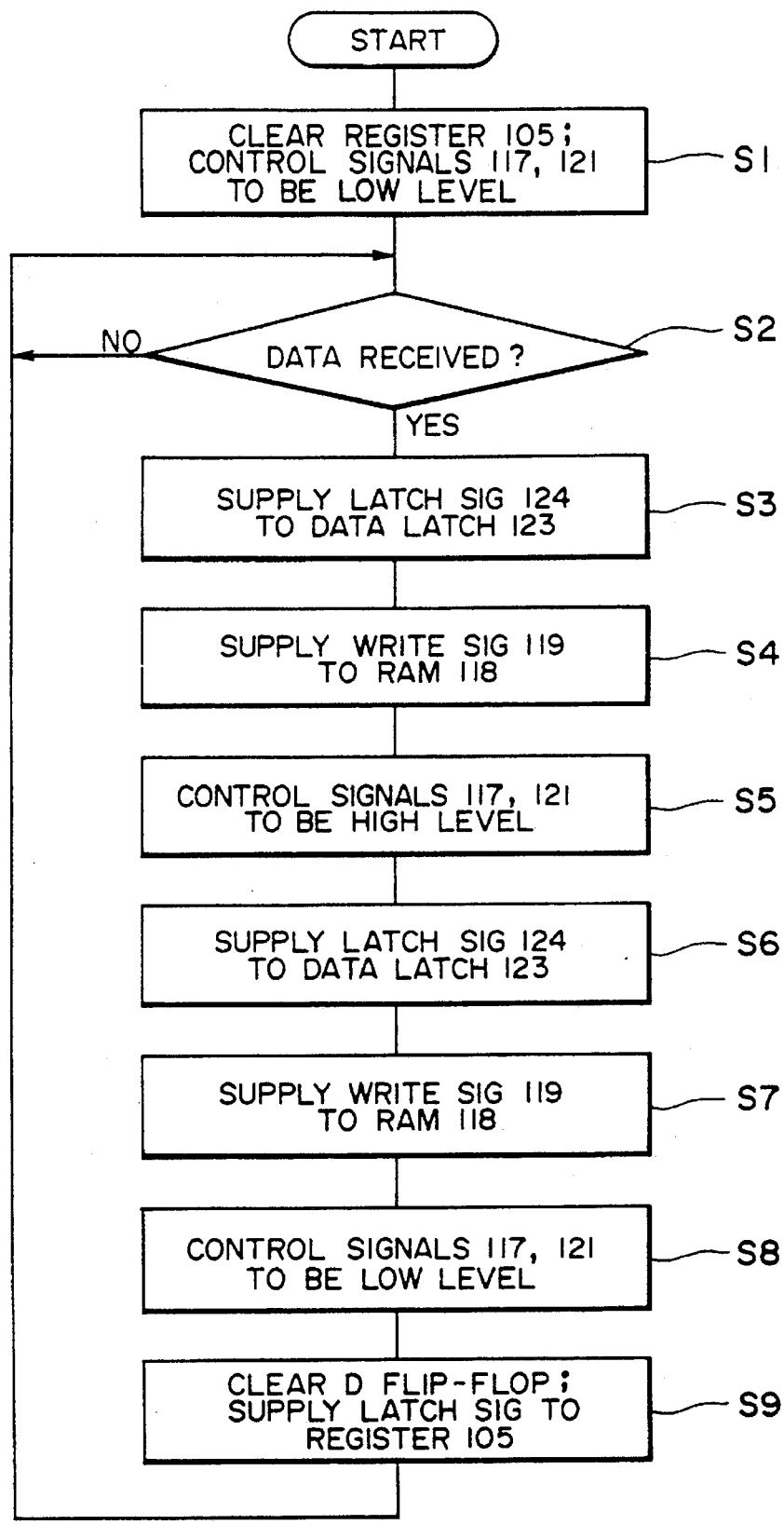
FIG. 5 shows a flow chart of an operation of a main control unit.

FIG. 5 shows a flow chart of a control procedure stored in the ROM 106-2 of the main control unit 106. In the flow chart of FIG. 5, a step to store the first character pattern into the RAM 118 is omitted.

In a step S1, the register 105 is cleared and the signals 117 and 121 are rendered to a low level. In a step S2, the Q output 127 of the D flip-flop 125 is checked to see whether the address data 114 and the data 101 have been externally supplied. If the data have been supplied, the process proceeds to a step S3 and the latch signal 124 is sent to the data latch 123 and the content at the current address 115 is sent to the OR circuit 122.

In a step S4, the write signal 119 is supplied to the RAM 118 to write the data 128 therein. In a step S5, the signals 117 and 121 are rendered high level, the address of the RAM 118 is incremented by one and the output data 120 of the ROM 120 is switched.

In steps S6 and S7, like in the steps S3 and S4, the content of the RAM 118 is latched in the data latch 123 and it is logically ORed with the data 120 by the OR circuit 122 and the output 128 thereof is written into the RAM 118. In a step S8, the signals 121 and 117 are again rendered to a low level. In a step S9, the D flip-flop is cleared and the content of the intercharacter pitch register 103 is added to the register 105.

In the present embodiment, the character pitch is 2 bits, the data 101 is 8-bit data and the address information 116 is 16-bit information, although the pitch data and information may be different in number.

While the main control unit 106 comprises the CPU in the embodiment, it may be hardware. The character pitch which determines the number of shifts may be designated by a digital switch in place of the memory.

Figure 6:
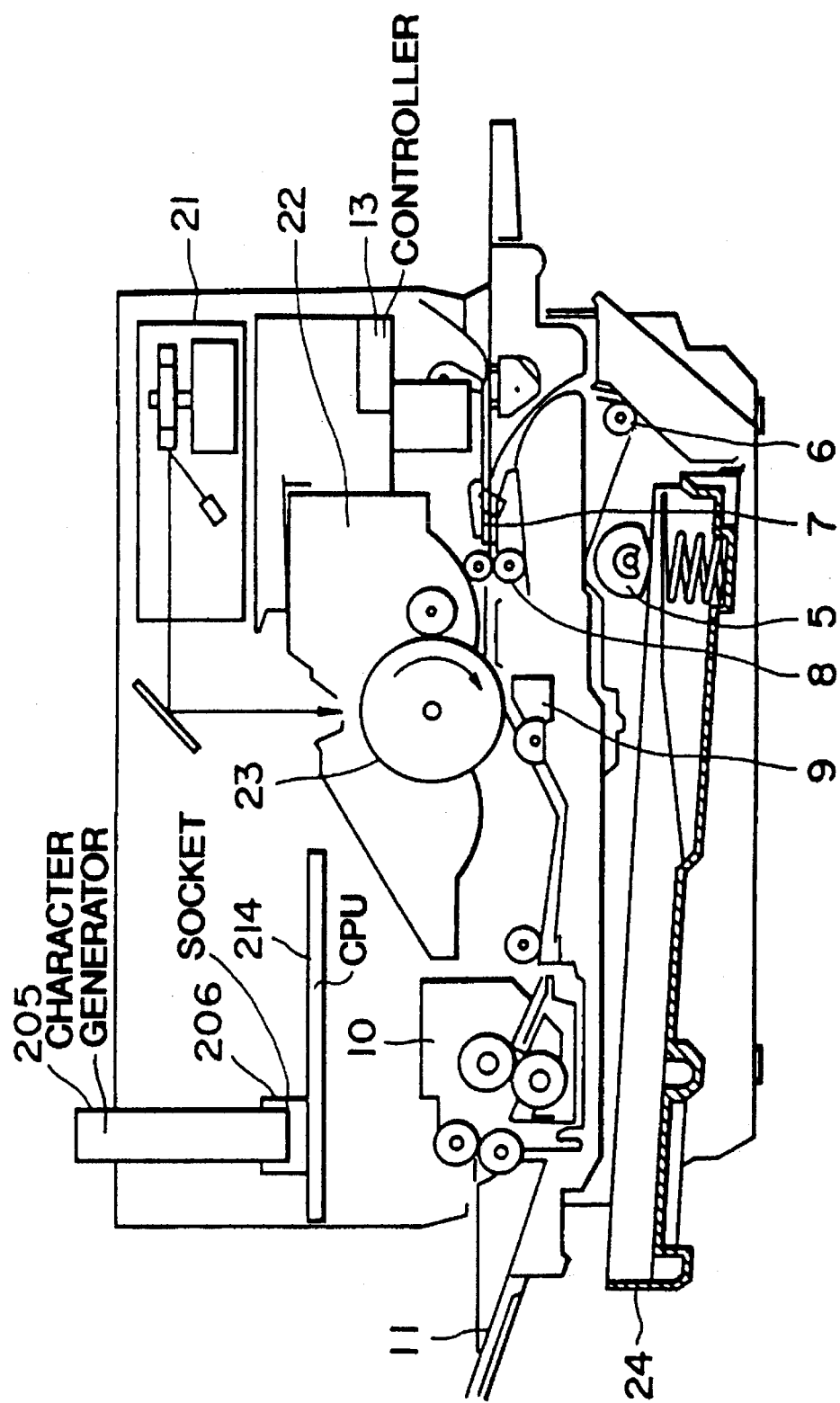
FIG. 6 shows a laser beam printer to which the present invention is applied.

FIG. 6 shows a sectional view of a laser beam printer to which the present invention is applied.

In FIG. 6, numeral 21 denotes an exposure unit having a scanner and a laser, numeral 22 denotes a developing unit for visualizing a latent image formed on a photoconductor drum 23, numeral 24 denotes a paper cassette, numeral 5 denotes a paper feed roller for feeding papers one by one from the paper cassette 24 to a feed roller 6, numeral 7 denotes a regist shutter by which the paper fed by the feed roller 6 is temporarily stopped so that synchronization is maintained between the projection of a laser beam, rotation of the photoconductor drum 23 and the feed of the paper, numeral 8 denotes a feed roller for feeding the paper into a transfer station 9, numeral 10 denotes a fixing unit for fixing a toner image transferred onto the paper, numeral 11 denotes a stacker for receiving ejected papers, numeral 205 denotes a pluggable character generator which generates character patterns in accordance with code signals sent from a host (not shown), numeral 206 denotes a socket, and numeral 214 denotes a CPU board on which the data conversion circuit shown in FIG. 1 is mounted.

In such a laser beam printer, a sequence of operation timings for feeding of paper and development are controlled by the sequence controller 13. The laser beam printer turns on and off the laser beam in accordance with the "1" and "0" video signals from the RAM 118 to form the visual image on the photoconductor drum 23.

The laser beam printer has a known beam detector to detect a beam scan position, and the "1" and "0" pattern data stored in the RAM 118 are read out in synchronism with the detection output of the beam detector.

The content of the intercharacter pitch register 103 may be set in accordance with a command sent from the host (not shown), or it may be automatically calculated based on a size of the sheet which the printer uses and the number of characters in the line.

The present invention is not limited to the illustrated embodiment but various modifications thereof may be made within a scope of the appended claims.

I claim:

1. A method for storing dot pattern data representing a character pattern in a memory of which each address is bits of predetermined length, including the steps of:

receiving dot pattern data composed of a part of the character pattern and shift amount data representing an amount to be shifted for the dot pattern data;

generating a bit string of predetermined length as the dot pattern data shifted in accordance with the received dot pattern data and the received shift amount data;

designating an address of the memory at which the bit string of predetermined length generated in said generating step is to be written; and writing the bit string of predetermined length at the address of the memory designated in said designating step, wherein when any bit string is already written at the designated address, the bit string as already written and the bit string of predetermined length generated in said generating step are combined and the thus-combined bit string of predetermined length is written at the address of the memory as designated in said designating step.

2. A method according to claim 1, wherein the shift amount data is generated on the basis of output intervals for the character pattern.

3. A method according to claim 1, wherein said memory has a memory capacity corresponding to one page.

4. A method according to claim 1, further comprising the step of outputting an image on the basis of the data stored in said memory.

5. A method according to claim 4, wherein in the output step, an image is printed on a record medium by using an electrostatic recording method.

6. A character processing apparatus which stores dot pattern data representing a character pattern in a memory of which each address is bits of predetermined length, said apparatus comprising:

receiving means for receiving dot pattern data composed of a part of the character pattern and shift amount data representing an amount to be shifted for the dot pattern data;

generating means for generating a bit string of predetermined length as the dot pattern data shifted in accordance with the received dot pattern data and the received shift amount data;

designating means for designating an address of the memory at which the bit string of predetermined length generated by said generating means is to be written; and writing means for writing the bit string of predetermined length at the address of the memory designated by said designating means, wherein when any bit string is already written at the designated address, the bit string as already written and the bit string of predetermined length generated by said generating means are combined and thus combined bit string of predetermined length is written at the address of the memory as designated by said designating means.

7. A character processing apparatus according to claim 6, wherein the shift amount data is generated on the basis of output intervals for the character pattern.

8. A character processing apparatus according to claim 6, wherein said memory has a memory capacity corresponding to one page.

9. A character processing apparatus according to claim 6, further comprising means for outputting an image on the basis of the data stored in said memory.

10. A character processing apparatus according to claim 9, wherein said output means prints an image on a recording medium by using an electrostatic recording method.

* * * * *